United States Patent
Liu et al.

(10) Patent No.: US 9,909,786 B2
(45) Date of Patent: Mar. 6, 2018

(54) REFRIGERANT DISTRIBUTION APPARATUS AND METHODS FOR TRANSPORT REFRIGERATION SYSTEM

(75) Inventors: Lucy Yi Liu, Fayetteville, NY (US); Suresh Duraisamy, Liverpool, NY (US); Gilbert B. Hofsdal, Chittenango, NY (US); Hans-Joachim Huff, Mainz (DE); Michal Patriak, Camillus, NY (US)

(73) Assignee: CARRIER CORPORATION, Farmington, CT (US)

( * ) Notice: Subject to any disclaimer, the term of this patent is extended or adjusted under 35 U.S.C. 154(b) by 1172 days.

(21) Appl. No.: 13/576,051

(22) PCT Filed: Mar. 7, 2011

(86) PCT No.: PCT/US2011/027363
§ 371 (c)(1),
(2), (4) Date: Jul. 30, 2012

(87) PCT Pub. No.: WO2011/112495
PCT Pub. Date: Sep. 15, 2011

(65) Prior Publication Data
US 2012/0318008 A1 Dec. 20, 2012

Related U.S. Application Data

(60) Provisional application No. 61/311,601, filed on Mar. 8, 2010.

(51) Int. Cl.
F25B 49/00 (2006.01)
F25B 9/00 (2006.01)
(Continued)

(52) U.S. Cl.
CPC .............. *F25B 9/008* (2013.01); *F25B 1/10* (2013.01); *F25B 41/043* (2013.01);
(Continued)

(58) Field of Classification Search
CPC .... F25B 1/10; F25B 2400/13; F25B 2600/05; F25B 2341/0662
See application file for complete search history.

(56) References Cited

U.S. PATENT DOCUMENTS 1,782,651 A * 11/1930 Hoffman ............... F25B 5/02
62/198
2,934,911 A * 5/1960 Micai ..................... F25B 41/04
62/117
(Continued)

FOREIGN PATENT DOCUMENTS

DE 69908716 T2 1/2004
EP 1953388 A1 11/1999
(Continued)

OTHER PUBLICATIONS

Singapore Search Report for application 201206125-5, dated Jan. 6, 2014, 5 pages.
(Continued)

*Primary Examiner* — Len Tran
*Assistant Examiner* — Alexis Cox
(74) *Attorney, Agent, or Firm* — Cantor Colburn LLP

(57) ABSTRACT

A method for distributing a refrigerant charge level in a refrigerant vapor compression system includes restarting a stopped refrigerant compression device in a first mode; operating a primary expansion device independent of refrigerant heat absorption heat exchanger superheat; comparing a condition at a refrigerant reservoir to a prescribed condition; wherein when the condition is below the prescribed condition for a prescribed interval, operating the primary expansion device to control the refrigerant heat absorption heat exchanger superheat; and transitioning the refrigerant vapor compression system to a second mode.

10 Claims, 5 Drawing Sheets

(51) Int. Cl.
  *F25B 1/10* (2006.01)
  *F25B 41/04* (2006.01)
(52) U.S. Cl.
  CPC ..... *F25B 2309/061* (2013.01); *F25B 2400/13* (2013.01); *F25B 2400/23* (2013.01); *F25B 2500/26* (2013.01); *F25B 2600/0261* (2013.01); *F25B 2600/2509* (2013.01); *F25B 2600/2513* (2013.01); *F25B 2600/2521* (2013.01); *F25B 2700/19* (2013.01); *F25B 2700/2106* (2013.01); *F25B 2700/21173* (2013.01)

(56) References Cited

U.S. PATENT DOCUMENTS

| | | | | |
|---|---|---|---|---|
| 3,118,751 | A * | 1/1964 | Seidel | F25J 1/0015 62/640 |
| 3,238,737 | A * | 3/1966 | Shrader | F25B 49/02 62/149 |
| 4,466,253 | A | 8/1984 | Jaster | |
| 5,062,274 | A | 11/1991 | Shaw | |
| 5,174,123 | A | 12/1992 | Erickson | |
| 5,189,885 | A | 3/1993 | Ni | |
| 5,692,389 | A | 12/1997 | Lord et al. | |
| 6,041,605 | A | 3/2000 | Heinrichs | |
| 6,941,769 | B1 | 9/2005 | Hill, IV et al. | |
| 7,891,201 | B1 * | 2/2011 | Bush et al. | 62/115 |
| 8,522,564 | B2 * | 9/2013 | Koppineedi | F25B 1/04 62/113 |
| 2002/0069654 | A1 * | 6/2002 | Doi | F25B 1/10 62/199 |
| 2006/0037336 | A1 | 2/2006 | Bush | |
| 2006/0080989 | A1 * | 4/2006 | Aoki | F25B 40/00 62/324.4 |
| 2006/0277931 | A1 * | 12/2006 | Nakamura | F04C 27/005 62/196.1 |
| 2007/0151269 | A1 | 7/2007 | Crane et al. | |
| 2008/0022706 | A1 * | 1/2008 | Sakimichi | F25B 1/10 62/190 |
| 2008/0223055 | A1 * | 9/2008 | Choi | F25B 1/10 62/193 |
| 2008/0289354 | A1 * | 11/2008 | Dudley | F25B 5/02 62/335 |
| 2009/0077985 | A1 * | 3/2009 | Takegami | F25B 13/00 62/175 |
| 2010/0115975 | A1 * | 5/2010 | Mitra | F25B 1/10 62/196.1 |
| 2011/0138825 | A1 * | 6/2011 | Chen | F25B 1/10 62/115 |
| 2011/0162397 | A1 * | 7/2011 | Huff | F25B 1/10 62/115 |
| 2012/0011866 | A1 * | 1/2012 | Scarcella | F25B 1/10 62/79 |
| 2012/0167601 | A1 * | 7/2012 | Cogswell | F25B 1/10 62/115 |
| 2012/0192579 | A1 * | 8/2012 | Huff | B60H 1/3232 62/115 |
| 2012/0227427 | A1 * | 9/2012 | Liu | F25B 1/10 62/115 |
| 2012/0318006 | A1 * | 12/2012 | Liu | F25B 41/043 62/80 |
| 2012/0318014 | A1 * | 12/2012 | Huff | F25B 1/10 62/228.1 |
| 2013/0031934 | A1 * | 2/2013 | Huff | F25B 1/10 62/510 |
| 2013/0255289 | A1 * | 10/2013 | Jung | F25B 43/00 62/115 |

FOREIGN PATENT DOCUMENTS

| | | |
|---|---|---|
| EP | 1562011 A2 | 8/2005 |
| EP | 1884725 A2 | 2/2008 |
| EP | 2075517 A1 | 7/2009 |
| EP | 2302310 A1 | 3/2011 |
| JP | 6410060 A | 1/1989 |
| JP | 2010048474 A | 3/2010 |
| WO | 2007094618 A2 | 8/2007 |
| WO | 2008130357 A1 | 10/2008 |
| WO | WO2008140454 A1 | 11/2008 |
| WO | WO2008143608 A1 | 11/2008 |
| WO | WO2009061804 A1 | 5/2009 |
| WO | 2009091399 | 7/2009 |
| WO | 2009091400 | 7/2009 |
| WO | 2009091401 A1 | 7/2009 |
| WO | WO2009104375 A1 | 8/2009 |
| WO | 2009147826 A1 | 12/2009 |

OTHER PUBLICATIONS

Notification of Transmittal of the International Preliminary Report on Patentability and the Written Opinion of the International Searching Authority, or the Declaration; PCT/US2011/027363; dated Jun. 6, 2013.

International Search Report and Written Opinion of the International Searching Authority for International Application No. PCT/US2011/027363, dated May 10, 2013, 24 pages.

* cited by examiner

REFRIGERANT DISTRIBUTION APPARATUS AND METHODS FOR TRANSPORT REFRIGERATION SYSTEM

CROSS-REFERENCE TO RELATED APPLICATION

This application claims priority to U.S. Provisional Patent Application Ser. No. 61/311,601 entitled "Refrigerant Distribution Apparatus and Methods for Transport Refrigeration System" filed on Mar. 8, 2010, the content of which is incorporated herein by reference in its entirety.

FIELD OF THE INVENTION

This disclosure relates generally to refrigeration systems and, more specifically, to methods and apparatus for controlling a refrigerant vapor compression system.

BACKGROUND OF THE INVENTION

Conventional vapor compression systems typically include a compressor, a heat rejection heat exchanger, a heat absorption heat exchanger, and an expansion device disposed upstream of the heat absorption heat exchanger. These basic system components are interconnected by working fluid lines in a closed circuit.

Depending upon the characteristics of the working fluid in use in a particular application, a vapor compression system may be operated in either a subcritical mode or a transcritical mode. In vapor compression systems operating in a subcritical cycle, both the vapor heat rejection heat exchanger and the heat absorption heat exchanger operate at pressures below the critical pressure of the working fluid. Thus, in the subcritical mode, the vapor heat rejection heat exchanger functions as a working fluid condenser and the heat absorption heat exchanger functions as a working fluid evaporator.

However, in refrigerant vapor compression systems operating in a transcritical cycle, the vapor heat rejection heat exchanger operates at a refrigerant temperature and pressure in excess of the refrigerant's critical pressure, while the heat absorption heat exchanger operates at a refrigerant temperature and pressure in the subcritical range. Thus, in the transcritical mode, the vapor heat rejection heat exchanger functions as a working fluid gas cooler and the heat absorption heat exchanger functions an as a working fluid evaporator.

In vapor compression systems used in refrigeration applications, commonly referred to as refrigerant vapor compression systems, the working fluid is refrigerant. Refrigerant vapor compression systems charged with conventional refrigerants, such as for example, fluorocarbon refrigerants such as, but not limited to, hydro chlorofluorocarbons (HCFCs), such as R22, and more commonly hydro fluorocarbons (HFCs), such as R134a, R404A, and R407c, typically operate in the subcritical mode. "Natural" refrigerants, such as carbon dioxide, are also used in refrigerant vapor compression systems instead of HCFC or HFC refrigerants. Because carbon dioxide has a low critical temperature, most refrigerant vapor compression systems charged with carbon dioxide as the refrigerant are designed for operation in the transcritical mode.

Refrigerant vapor compression systems used in connection with transport refrigeration systems are generally subject to more stringent operating conditions than in air conditioning or commercial refrigeration applications due to the wide range of operating load conditions and the wide range of outdoor ambient conditions over which the refrigerant vapor compression system must operate to maintain product within the cargo space at a desired temperature. The desired temperature at which the cargo needs to be controlled can also vary over a wide range depending on the nature of cargo to be preserved. The refrigerant vapor compression system must not only have sufficient capacity to rapidly pull down the temperature of product loaded into the cargo space at ambient temperature, but also operate efficiently at low load when maintaining a stable product temperature during transport. Additionally, transport refrigerant vapor compression systems are subject to cycling between an operating mode and standstill mode, e.g., an idle state.

SUMMARY OF THE INVENTION

According to one aspect, the present disclosure can provide a refrigerant vapor compression system that can detect refrigerant redistribution during compressor or unit off cycle to address high refrigerant level inside refrigerant reservoir (e.g., flash tank), for example, upon restart. Embodiments according to the disclosure can use selected control of a refrigerant vapor compression system or components thereof to improve compressor reliability, reduce or prevent liquid entering compressor mid-stage, reduce or prevent refrigerant vapor compression system disabling because of pressure spikes, or relief valve set off. Embodiments according to the disclosure can address high ambient temperature and frozen container set point operations such as restart.

According to one aspect, the present disclosure can provide a refrigerant vapor compression system that can operate a primary expansion valve independent of component superheat, operate a primary expansion valve a prescribed percentage open or throughput level, controllably open (e.g., pulse) a liquid refrigerant valve/line or economizer valve/line or enable vapor refrigerant to controllably reach an inlet of the compressor to address refrigerant redistribution during unit shut off.

In one embodiment, a method for restarting a refrigerant vapor compression system, the refrigerant vapor compression system having a primary refrigerant circuit including a refrigerant compression device, a refrigerant heat rejection heat exchanger downstream of said compression device, a refrigerant reservoir downstream of the heat rejection heat exchanger; a refrigerant heat absorption heat exchanger downstream of said refrigerant reservoir, and a primary expansion device disposed in the refrigerant circuit downstream of said refrigerant reservoir and upstream of said refrigerant heat absorption heat exchanger; the method can include restarting components in the refrigerant vapor compression system with the primary expansion device at a prescribed opening to controllably remove liquid from the refrigerant reservoir; restarting the refrigerant compression device in a first mode; operating the primary expansion device at the prescribed opening, opening an unload service valve and opening an economizer solenoid valve; operating the transport refrigeration system in a selected operating mode; closing the unload service valve; and transitioning the refrigerant compression device to a second mode.

In one embodiment, a method for distributing a refrigerant charge level in a refrigerant vapor compression system, the refrigerant vapor compression system having a primary refrigerant circuit including a refrigerant compression device, a refrigerant heat rejection heat exchanger downstream of said compression device, a refrigerant heat absorption heat exchanger downstream of said refrigerant heat rejection heat exchanger, and a primary expansion device disposed in the refrigerant circuit downstream of said refrigerant heat rejection heat exchanger and upstream of said refrigerant heat absorption heat exchanger; the method can include driving components in the refrigerant vapor compression system, restarting the refrigerant compression device in a first mode; operating the primary expansion device independent of refrigerant heat absorption heat exchanger superheat; comparing a condition at a flash tank to a prescribed condition; wherein when the condition is below the prescribed level for a prescribed interval, operating the primary expansion device to control the refrigerant heat absorption heat exchanger superheat; and transitioning the refrigerant vapor compression system to a second mode.

In one embodiment, a method for transitioning a refrigerant vapor compression system to a second mode, the refrigerant vapor compression system including a primary refrigerant circuit including a refrigerant compression device, a refrigerant heat rejection heat exchanger downstream of said compression device, a refrigerant heat absorption heat exchanger downstream of said refrigerant heat rejection heat exchanger, a primary expansion device disposed in the refrigerant circuit downstream of said refrigerant heat rejection heat exchanger and upstream of said refrigerant heat absorption heat exchanger, and a secondary expansion valve upstream of a refrigerant reservoir between the heat rejection heat exchanger and the heat absorption heat exchanger, the method can include restarting the refrigerant vapor compression system with the primary and secondary expansion devices at first and second prescribed openings, respectively; restarting the refrigerant compression device in a first mode; operating the transport refrigerant system in a prescribed operating mode; operating a third refrigerant flow device to controllably migrate additional liquid refrigerant from the refrigerant reservoir to an inlet of the refrigerant compression device; and when a prescribed interval has passed since restarting the refrigerant compression device, transitioning the refrigerant vapor compression system to a second mode.

BRIEF DESCRIPTION OF THE DRAWINGS

For a further understanding of the invention, reference will be made to the following detailed description of the invention which is to be read in connection with the accompanying drawing, wherein.

DETAILED DESCRIPTION OF THE INVENTION

Figure 1:
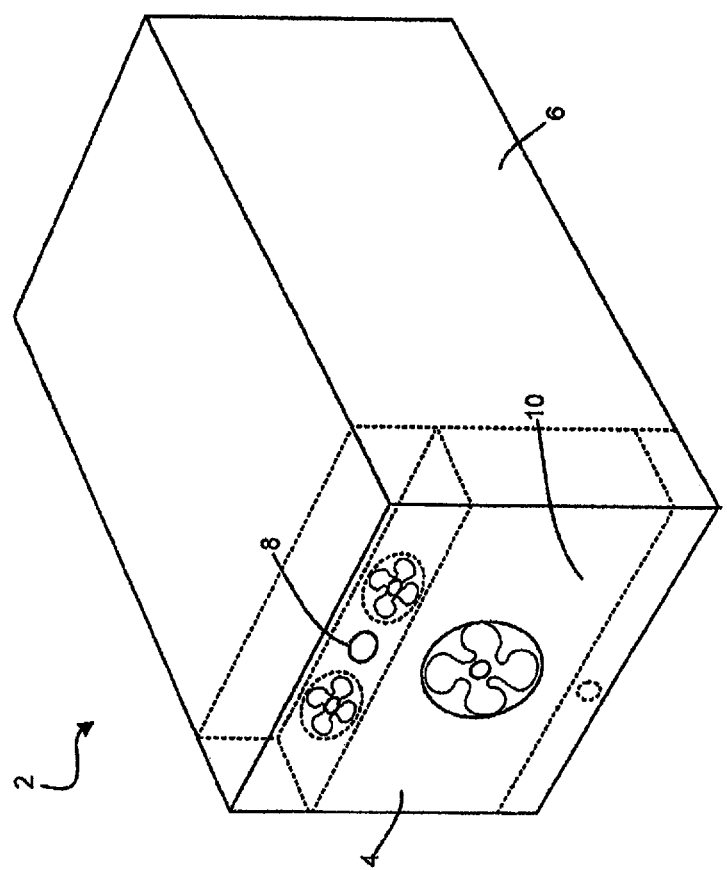
FIG. 1 schematically illustrates an embodiment of a refrigerant vapor compression system according to the application.

Referring to FIG. 1, a refrigerant vapor compression system 2 may include a transport refrigeration unit 4 coupled to an enclosed space within a container 6. The container 6 may be a temperature controlled environment, such as a cargo box of a refrigerated transport truck, trailer or container, or a display case, merchandiser, freezer cabinet, cold room or other perishable/frozen product storage area in a commercial establishment, or a climate controlled comfort zone within a residence, office building, hospital, school, restaurant or other facility. In the disclosed example, the refrigerant vapor compression system 2 is of the type utilized on refrigerated transport truck. As shown in FIG. 1, the transport refrigeration unit 4 is configured to maintain a programmed thermal environment within the container 6.

In FIG. 1, the transport refrigeration unit 4 is mounted at one end of the container 6. However, the transport refrigeration unit 4 may also be mounted to one or more sides of the container 6. Further, the transport refrigeration unit 4 can be integral to the container 6. In one embodiment, a plurality of transport refrigeration units 4 may be mounted to a single container 6. Alternatively, a single transport refrigeration unit 4 may be mounted to a plurality of containers 6 or multiple enclosed spaces within a single container. The transport refrigeration unit 4 typically operates to intake air at a first temperature and to exhaust air at a second temperature. In one embodiment, the exhaust air from the transport refrigeration unit 4 will be warmer than the intake air such that the transport refrigeration unit 4 is utilized to warm the air in the container 6. In another embodiment, the exhaust air from the transport refrigeration unit 4 will be cooler than the intake air such that the transport refrigeration unit 4 is utilized to cool the air in the container 6.

In one embodiment, the transport refrigeration unit 4 may include one or more temperature sensors to continuously or repeatedly monitor the return air temperature and/or the supply air temperature. As shown in FIG. 1, a supply air temperature sensor (STS) 8 of the transport refrigeration unit 4 may provide the supply temperature and a return air temperature sensor (RTS) 10 of the transport refrigeration unit 4 may provide the return temperature to the transport refrigeration unit 4, respectively. Alternatively, the supply temperature and the return temperature may be determined using remote sensors.

A refrigerant vapor compression system 2 may provide air with controlled temperature, humidity or/and species concentration into an enclosed chamber where cargo is stored such as in container 6. The refrigerant vapor compression system 2 is capable of controlling a plurality of the environmental parameters or all the environmental parameters within corresponding ranges with a great deal of variety of cargos and under all types of ambient conditions.

Figure 2:
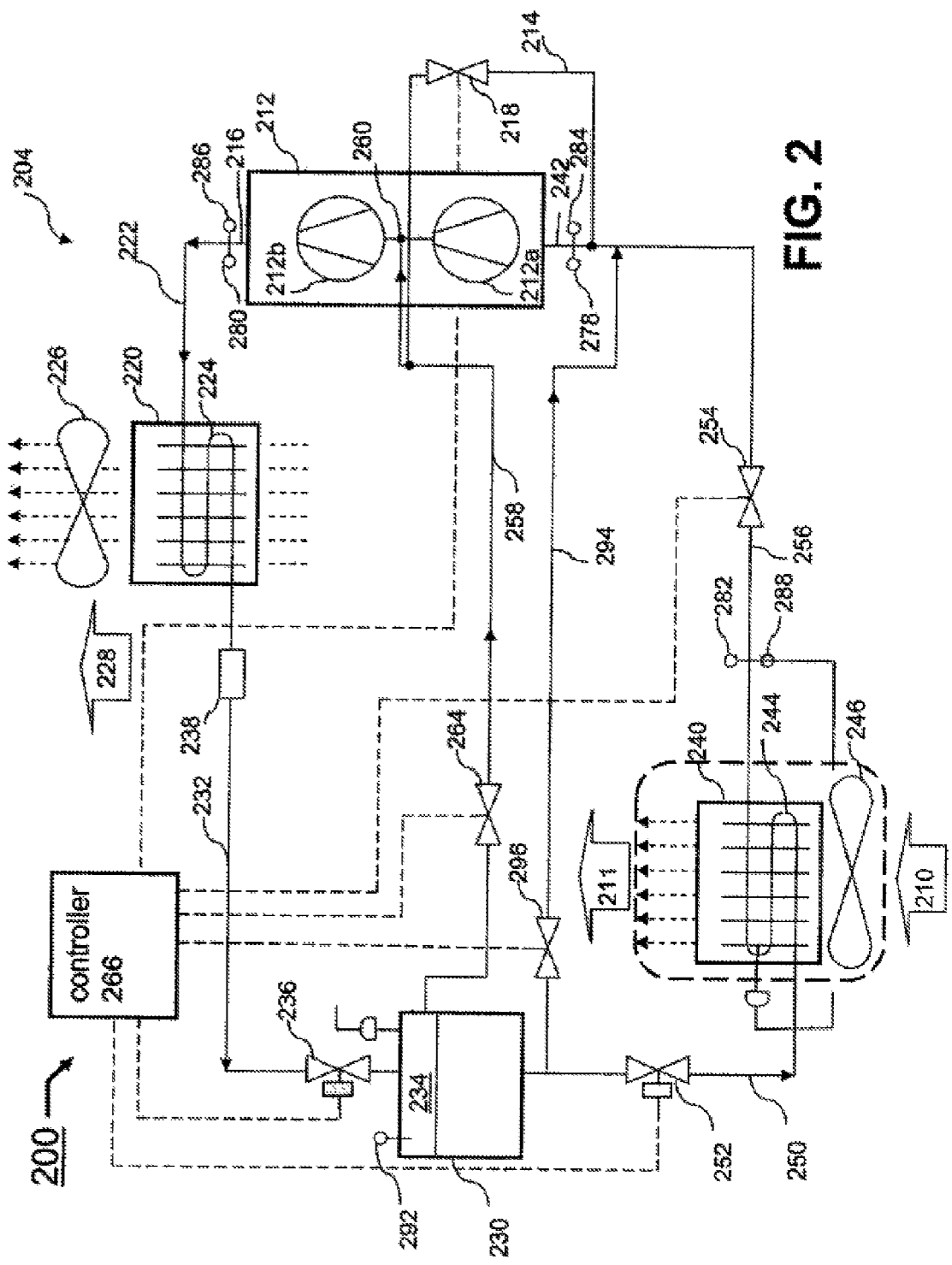
FIG. 2 schematically illustrates an exemplary embodiment of the transport refrigeration unit of FIG. 1.

Referring to FIG. 2 of the drawings, an exemplary embodiment of a refrigerant vapor compression system 200 designed for operation with a high pressure refrigerant in a transcritical cycle with a low critical point refrigerant is shown. The low critical point refrigerant may be carbon dioxide and refrigerant mixtures containing carbon dioxide, for example. However, it is to be understood that the refrigerant vapor compression system 200 may also be operated in a subcritical cycle with a higher critical point refrigerant such as conventional hydro chlorofluorocarbon and hydro fluorocarbon refrigerants.

The refrigerant vapor compression system 200 is particularly suitable for use in a transport refrigeration system for refrigerating the air or other gaseous atmosphere within the temperature controlled enclosed volume such as a cargo space of a truck, trailer, container, or the like for transporting perishable/frozen goods. The refrigerant vapor compression system 200 is also suitable for use in conditioning air to be supplied to a climate controlled comfort zone within a residence, office building, hospital, school, restaurant, or other facility. The refrigerant vapor compression system 200 could also be employed in refrigerating air supplied to display cases, merchandisers, freezer cabinets, cold rooms or other perishable/frozen product storage areas in commercial establishments.

The refrigerant vapor compression system 200 can include a multi-stage compressor 212, wherein the refrigerant is compressed to a higher temperature and pressure. The compressor 212 may be powered by single phase electric power, three phase electrical power, and/or a diesel engine and can, for example, operate at a constant speed or operate with a variable frequency drive. The compressor 212 may be a scroll compressor, a rotary compressor, a reciprocal compressor, or the like. The transport refrigeration unit 204 requires electrical power from, and can be connected to, a power supply unit (not shown) such as a standard commercial power service, an external power generation system such as that found shipboard, a diesel generator, or the like.

In the illustrated embodiment, the compressor 212 is a single multiple stage refrigerant compressor, for example a compressor disposed in the primary refrigerant circuit and having a first compression stage 212a and a second compression stage 212b. The first and second compression stages are disposed in series refrigerant flow relationship, with the refrigerant leaving the first compression stage 212a passing directly to the second compression stage 212b for further compression. Alternatively, the compressor 212 may comprise a pair of independent compressors 212a and 212b, connected in series refrigerant flow relationship in the primary refrigerant circuit via a refrigerant line connecting the discharge outlet port of the first compressor 212a in refrigerant flow communication with an inlet port (e.g., the suction inlet port) of the second compressor 212b. In the independent compressor embodiment, the compressors 212a and 212b may be reciprocating compressors, rotary compressors, or any other type of compressor or a combination of any such compressors. In the embodiment depicted in FIG. 2, the refrigerant vapor compression system 200 includes a bypass line 214 providing a refrigerant flow passage from an intermediate port 260 of the compressor 212 back to the suction side of the compressor. An unload valve 218 disposed in the bypass line 214 may be selectively positioned in an open position in which refrigerant flow passes through the bypass line 214 and a closed position in which refrigerant flow through the bypass line 214 is partially restricted or shut off.

The refrigerant vapor compression system 200 further includes a refrigerant heat rejection heat exchanger 220 operatively coupled to a discharge port 216 of the compressor 212 along a compressor discharge line 222. In a refrigerant vapor compression system operating in a transcritical cycle, such as systems utilizing carbon dioxide refrigerants, for example, the refrigerant heat rejection heat exchanger 220 is commonly referred to as a gas cooler. The supercritical refrigerant (gas) passes in heat exchange relationship with a cooling medium such as ambient gas or liquid (e.g., air or water), for example. In a refrigerant vapor compression system operating in a subcritical cycle, such as systems utilizing fluorocarbon refrigerants for example, the refrigerant heat rejection heat exchanger 220 is commonly referred to as a condenser. The condenser may include a refrigerant condensing heat exchanger through which hot, high pressure refrigerant vapor passes in heat exchange relationship with the cooling medium and is condensed to a liquid.

The refrigerant heat rejection heat exchanger 220 may comprise a finned-tube heat exchanger, such as a fin and round tube heat exchange coil or a fin and mini-channel flat tube heat exchanger, for example. Refrigerant passes through serpentine tubes 224 in heat exchange relationship with ambient air being drawn through the heat exchanger 220 by one or more fans 226. The air stream from the fan 226 allows heat to be removed from the refrigerant circulating within the refrigerant heat rejection heat exchanger 220. An ambient air temperature sensor (AAT) 228 may be positioned upstream of the fan 226 to sense the ambient air temperature.

The refrigerant vapor compression system 200 may include a refrigerant reservoir or receiver 230 operatively disposed downstream of the refrigerant heat rejection heat exchanger 220 along a condenser discharge line 232 to provide storage for excess liquid refrigerant (e.g., low temperature operation). In one example, the receiver 230 is a flash tank receiver having a separation chamber 234 where refrigerant in the liquid state collects in a lower portion of the separation chamber and refrigerant in the vapor state collects in the portion of the separation chamber above the liquid refrigerant. In the example, the refrigerant is carbon dioxide ($CO_2$). As the $CO_2$ refrigerant leaves the refrigerant heat rejection heat exchanger 220, it passes through an auxiliary expansion valve 236. The auxiliary expansion valve 236 may be a variable control valve selectively positionable so as to expand the refrigerant to a lower pressure so it enters the flash tank receiver 230 as a mixture of liquid refrigerant and vapor. The flash tank receiver 230 operates as a charge control tank. The liquid refrigerant settles in the lower portion of the flash tank receiver 230 and the refrigerant vapor collects in the upper portion. A filter drier 238 may be disposed downstream of the heat rejection heat exchanger 220 along a refrigerant liquid line 232 to keep the refrigerant clean and dry.

In another embodiment, the receiver 230 may include a water-cooled condenser and associated plumbing (not shown).

Whether the refrigerant vapor compression system 200 is operating in a transcritical cycle or a subcritical cycle, the system further includes a refrigerant heat absorption heat exchanger 240, also referred to herein as an evaporator, operatively coupled between the refrigerant heat rejection heat exchanger 220 and a suction port 242 of the compressor 212. In the refrigerant heat absorption heat exchanger 240, refrigerant liquid or a mixture of refrigerant liquid and vapor is passed in heat exchange relationship with a fluid to be cooled, most commonly air, drawn from and returned to the container 6. In one example, the refrigerant heat absorption heat exchanger 240 comprises a finned tube heat exchanger 244 through which refrigerant passes in heat exchange relationship with air drawn from and returned to the refrigerated container 6 by one or more evaporator fans 246. The finned tube heat exchanger 244 may comprise, for example, a fin and round tube heat exchange coil or a fin and mini-channel flat tube heat exchanger. The evaporator fan 246 may be located and ducted so as to circulate the air contained within the container 6. In one embodiment, the evaporator fan 246 directs the stream of air across the surface of the finned tube heat exchanger 244, thereby removing heat from the air, and the reduced temperature air is then circulated within the enclosed volume of the container 6 to lower the temperature of the enclosed volume.

A primary expansion device may be connected along an evaporator inlet line 250 between an output of the refrigerant heat rejection heat exchanger 220 and an input of the refrigerant heat absorption heat exchanger 240. In the disclosed embodiment, the primary expansion device is an electronic expansion valve 252 or EVXV 252 to meter the refrigerant flow so as to maintain a desired level of superheat in the refrigerant vapor leaving the heat absorption heat exchanger 240. The expansion valve 252 can be an adiabatic expansion valve and help to ensure that no liquid is present in the refrigerant leaving the heat absorption heat exchanger 240. The low pressure refrigerant vapor leaving the heat absorption heat exchanger 240 returns to the suction port 242 of the first compression stage or first compressor 212a.

In one embodiment, the refrigerant vapor compression system 2 further includes a suction modulation valve 254. In the illustrated example, the suction modulation valve 254 is positioned along a suction inlet line 256 between the outlet of the refrigerant heat absorption heat exchanger 240 and the tee for the compressor unload bypass line 214. The suction modulation valve 254 can be an adiabatic expansion device and be used for capacity modulation. The suction modulation valve 254 may comprise a pulse width modulated solenoid valve in one example.

Additionally, the refrigerant vapor compression system 2 may include an economizer circuit establishing refrigerant vapor flow along an injection line 258 between the receiver 230 and an intermediate inlet port 260 of the compressor 212. The economizer circuit includes an economizer solenoid valve 264 to control the refrigerant flow between the receiver 230 and a compressor economize port. In the illustrated embodiment, the economizer solenoid valve 264 is disposed in operative association with and downstream of the receiver 230. The economizer solenoid valve 264 may be a high pressure electronic expansion valve or a solenoid valve, for example. The vapor injection line 258 connects the upper portion of the separation chamber 234 of the flash tank receiver 230 to the intermediate inlet port 260 of the compressor 212.

The refrigerant vapor compression system 2 also includes a control system operatively associated therewith for controlling operation of the refrigerant vapor compression system. The control system can include a controller 266 that can determine the desired mode of operation in which to operate the refrigerant vapor compression system 2 based upon consideration of refrigeration load requirements, ambient conditions and various sensed system operating parameters. In the disclosed embodiment, the controller 266 can include a microprocessor.

Among the specific sensors and transducers monitored by the controller 266 are the return air temperature sensor (RAT) 210 and supply air temperature sensor (SAT) 211 that can input values according to the evaporator return air temperature; and the supply air temperature, respectively; the ambient air temperature (AAT) sensor 228 can input a value according to the ambient air temperature read in front of the refrigerant heat rejection heat exchanger 220; a compressor suction temperature (CST) sensor 278 that can input a variable resistor value according to the compressor suction temperature; a compressor discharge temperature (CDT) sensor 280 that can input a value according to the compressor discharge temperature inside the dome of the compressor 212; an evaporator outlet temperature (EVOT) sensor 282 that can input a value according to the outlet temperature of the refrigerant heat absorption heat exchanger 240; the compressor suction pressure (CSP) transducer 284 that can input a value or voltage according to the compressor suction value of the compressor 212; the compressor discharge pressure (CDP) transducer 286 that can input a voltage according to the compressor discharge value of the compressor 212; the evaporator outlet pressure (EVOP) transducer 288 that can input a voltage according to the outlet pressure of the refrigerant heat absorption heat exchanger 240; and/or additional sensors used by the system 2.

The controller 266 processes the data received from the various sensors and controls operation of the compressor 212, operation of the fan(s) 226 associated with the refrigerant heat rejection heat exchanger 220, operation of the evaporator fan(s) 246, operation of the expansion valve 252, and operation of the suction modulation valve 254. In the FIG. 2 embodiment, the controller 266 may also control the positioning of the unload valve 218 to selectively open the unload valve to bypass refrigerant from an intermediate pressure stage of the compressor 212 through the bypass line 214 back to the suction side of the compressor 212 when it is desired to unload the first stage of the compressor.

In the embodiment depicted in FIG. 2, the refrigerant vapor compression system 2 may further include a refrigerant liquid injection line 294. The refrigerant liquid injection line 294 can tap into the refrigerant liquid line 250 at a location downstream of the receiver 230 and upstream of the expansion valve 252 and open into the suction port 242 of the compressor 212. A liquid injection flow control device 296 may be disposed in the liquid injection line 294. The liquid injection flow control device 296 may comprise a flow control valve selectively positionable between an open position, wherein refrigerant liquid flow may pass through the liquid injection line 294, and a closed position wherein refrigerant liquid flow through the refrigerant liquid injection line 294 is reduced or blocked. In an embodiment, the liquid injection flow control device 296 comprises a two-position solenoid valve of the type selectively positionable between a first open position and a second closed position.

In the exemplary embodiment of the refrigerant vapor compression system 2 depicted in FIG. 2, injection of refrigerant vapor into the intermediate inlet port 260 of the compressor 212 would be accomplished by injection of the refrigerant vapor (e.g., injection line 258) into the refrigerant passing from the first compression stage 212a into the second compression stage 212b of the compressor 212.

The controller 266 may also control the positioning of the auxiliary expansion valve 236, the economizer solenoid valve 264, and/or the liquid injection flow control device 296. The controller 266 may position the auxiliary expansion valve 236 responsive to temperature and pressure measurements at the exit of the refrigerant heat rejection heat exchanger 220. The controller 266 may also control the positioning of the economizer solenoid valve 264 to selectively permit refrigerant vapor to pass from the receiver 230 through the injection line 258 for admittance into the intermediate inlet port 260 of the compressor 212. Similarly, the controller 266 may also position the liquid injection flow control device 296 in an open position for selectively permitting refrigerant liquid to pass from the receiver 230 through the liquid injection line 294 for injection into the suction port 242 of the compressor 212.

In a transcritical transport refrigeration systems or a high pressure refrigerant transport refrigeration systems, a refrigerant reservoir or flash tank can be used as both a charge storage device and a heat exchanger. A smaller flash tank is desired for easy conformation to safety codes and cost. However, for transport refrigeration systems, depending on ambient and cargo control temperature, the amount of refrigerant circulating within the transport refrigeration system 200 can vary greatly, which can cause the liquid refrigerant level in the flash tank receiver 230 to vary greatly. In certain transient conditions, the liquid refrigerant level inside the flash tank receiver 230 can be so high that the flash tank receiver 230 is close to full. When the flash tank receiver 230 is close to full and the economizer solenoid valve 264 is open, then liquid rich refrigerant can be sent to compressor mid stage or into the intermediate inlet port 260 and cause a pressure spike either at the compressor mid stage or the compressor discharge or both. Consequences of such pressure spikes can include compressor shut down, pressure relief valve set off or damage to internal compressor parts.

One exemplary operation that can result in the flash tank receiver to be filled with liquid refrigerant is when compressor restarts after cycling off. For example, the compressor can cycle off upon reaching low box set point (e.g., temperature). In one embodiment, when the compressor 212 cycles off, either because of reaching set point, power loss or abnormal operating conditions or the like, refrigerant can be migrated to the coldest part of the transport refrigeration system, e.g., evaporator coil and/or compressor sump. When the compressor 212 cycles back on, the EVXV 252 opening stays small or at a low percentage opening in order to evaporate liquid that is already in the evaporator coil or finned tube heat exchanger 244. With small opening of EVXV 252, the flash tank receiver 230 becomes filled with liquid refrigerant very quickly. When the flash tank receiver is close to full, and the economizer valve is open, then the consequence can be compressor shut down, pressure relief valve set off or compressor internal parts damaged. Further, if ambient temperature is higher than critical point of refrigerant, then the flash tank pressure will be in supercritical zone and further cause the refrigerant vapor compression system 200 high side pressure control problems.

In one embodiment, the high liquid level inside flash tank receiver can be caused by refrigerant redistribution in the transport refrigeration system during the compressor off cycle or transport refrigeration unit 204 off cycle. Embodiments according to the application can address (e.g., predict) the refrigerant redistribution and address the refrigerant redistribution through control methods. Exemplary methods first identify or determine operating transient conditions that can generate the refrigerant redistribution to cold spot (e.g., out of the heat exchanger, condenser) of the transport refrigeration system. In one embodiment, such operating transient conditions can be determined or mapped out in terms of ambient and cargo control temperature.

When refrigerant redistribution has occurred during the cycling off of the unit 204, refrigerant has to be quickly removed from the flash tank receiver 230 (e.g., as fast as possible) upon compressor 212 restart. Under these conditions, the compressor 212 can start up in unloaded mode as usual. Once compressor 212 stages up to standard mode, several control operations for components of the transport refrigeration unit 204 can be used. For example, the controller 266 can implant exemplary control operations including: 1) instead of using EVXV 252 to control evaporator outlet superheat, the EVXV 252 can be positioned to a larger opening for a very short time (e.g., within one or 2 minutes) in order to circulate refrigerant out of flash tank receiver. With a forced larger opening of the EVXV 252, liquid refrigerant can migrate out of the flash tank receiver 230 quickly and reduce flash tank pressure to sub-critical zone or pressure. Then, the EVXV 252 can go back to evaporator outlet superheat control. 2) Pulse open the ESV or economizer solenoid valve 264 (economizer service valve) to allow refrigerant to migrate out of the flash tank receiver 230 through the economizer solenoid valve 264. In this operation, pulsing is intended to cover any other controlled and/or modulated way to operate the economizer solenoid valve 264 that can function to allow refrigerant to migrate out of the flash tank receiver 230. 3) Pulse open the liquid injection valve (LIV) or liquid injection flow control device 296 to allow refrigerant to migrate out of flash tank receiver 230 through the liquid injection flow control device 296. In this operation, pulsing is intended to cover any other controlled and/or modulated way to operate the liquid injection flow control device 296 that can function to allow refrigerant to migrate out of the flash tank receiver 230.

These exemplary control methods according to embodiments of the application should be or have to be completed before the unit 204 tries to enter economized mode. In one embodiment, either a pressure transducer or a temperature sensor installed at the flash tank receiver 230 can be used for control of operations (e.g., refrigerant redistribution) of the unit 204.

According to embodiments of the application, the unit 204 can transition into economized mode for higher efficiency and higher capacity operation safely and smoothly. In one embodiment, the unit 204 can transition into economized mode faster.

An embodiment of a method of operating a transport refrigeration system according to the application will now be described. The method embodiment shown in FIG. 3, can be implemented in and will be described using a transport refrigeration system embodiment shown in FIG. 2, however, the method embodiment is not intended to be limited thereby.

Figure 3:
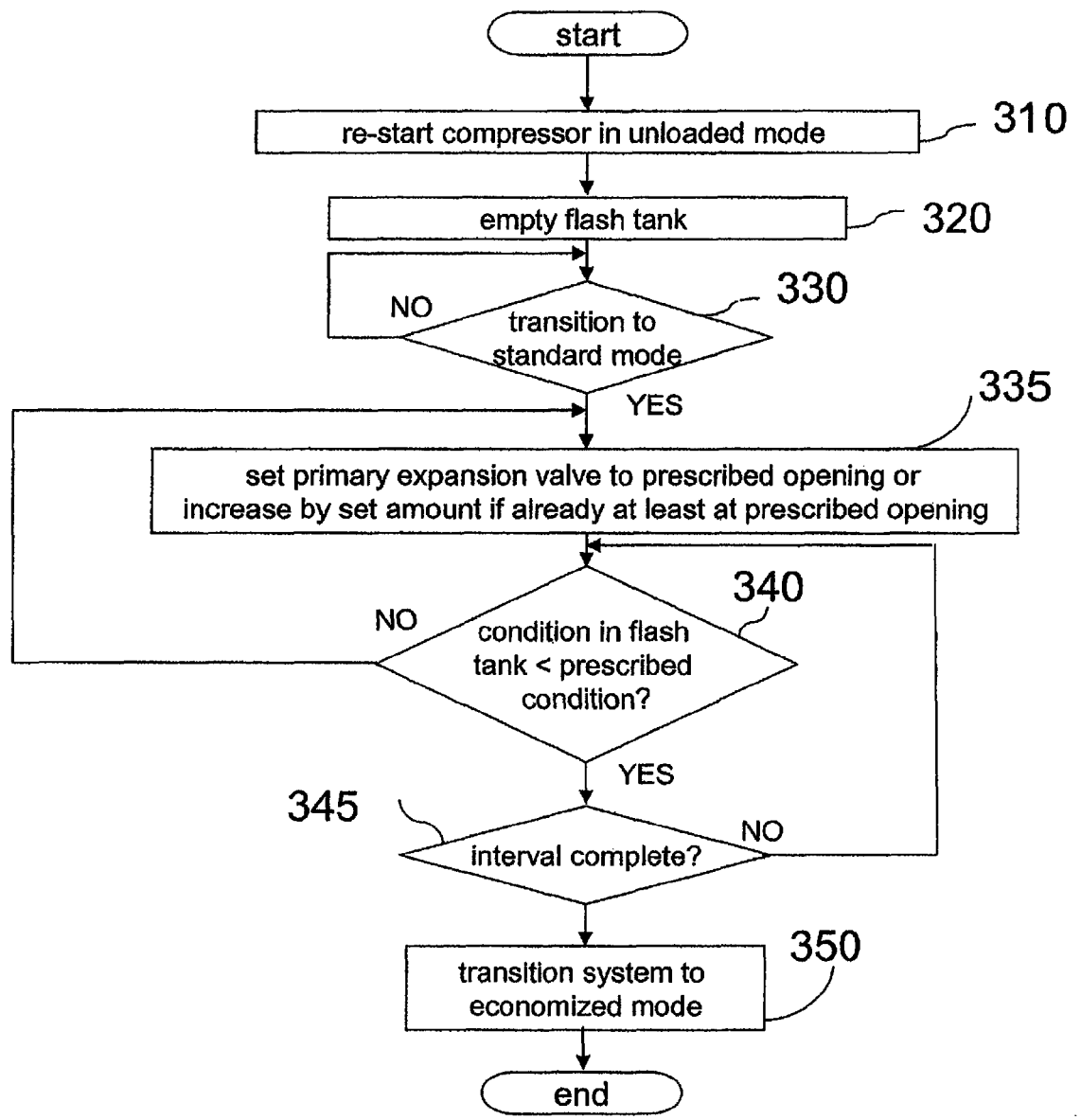
FIG. 3 is a flowchart that illustrates an embodiment of method of operating a transport refrigeration system according to the application.

Referring now to FIG. 3, a process can start when the compressor restarts. In one embodiment, the compressor can start up with an unload valve 218 open and an economizer solenoid valve 264 open (operation block 310). With the unload valve 218 open, the flash tank receiver can optionally be emptied or move refrigerant from the flash tank to a lower pressure point or region of the transportation refrigeration unit (operation block 320). Then, a transition of the compressor 212 to a standard mode can be monitored (operation block 330). When it is determined that the compressor 212 has transitioned to a standard mode, (e.g., operation block 330, YES), control continues to operation block 335 where the EVXV valve can be positioned at a prescribed opening (e.g., 75% open, 80% open) in order to circulate liquid refrigerant out of the flash tank receiver 230. Then, conditions in the flash tank receiver can be compared to a prescribed condition. For example, a pressure transducer or a temperature sensor can be installed at the flash tank receiver (operation block 340). The prescribed condition in operation block 340 can be a prescribed pressure such as a critical pressure or refrigerant critical point, a prescribed temperature or the like.

When the determination in operation block 340 is affirmative, control jumps to operation block 345, where it can be determined whether a predetermined interval of time has elapsed. When the determination in operation block 340 is negative, the opening of the EVXV valve can be increased by a prescribed amount such as 5% or 10% if it is currently equal to or has a larger opening than the prescribed opening (operation block 335). If the determination in operation block 345 is affirmative because the predetermined time period has elapsed, then control passes to operation block 350, where the system can be transitioned to an economized mode. When the determination in operation block 345 is negative because the predetermined time period has not elapsed, control returns to operation block 340. From operation block 350, the process can end.

Alternatively, as described above, the compressor 212 can transition to other cooling modes in operation block 330 and/or operation block 350, e.g., as determined by cooling capacity requirements. Further, in operation block 335, the EVXV 252 can operate independent of heat absorption heat exchanger superheat.

An embodiment of a method of transitioning a transport refrigeration unit according to the application will now be described. The method embodiment shown in FIG. 4 can be implemented and it will be described using a refrigerant vapor compression system embodiment shown in FIG. 2; however, the method embodiment is not intended to be limited thereby.

Figure 4:
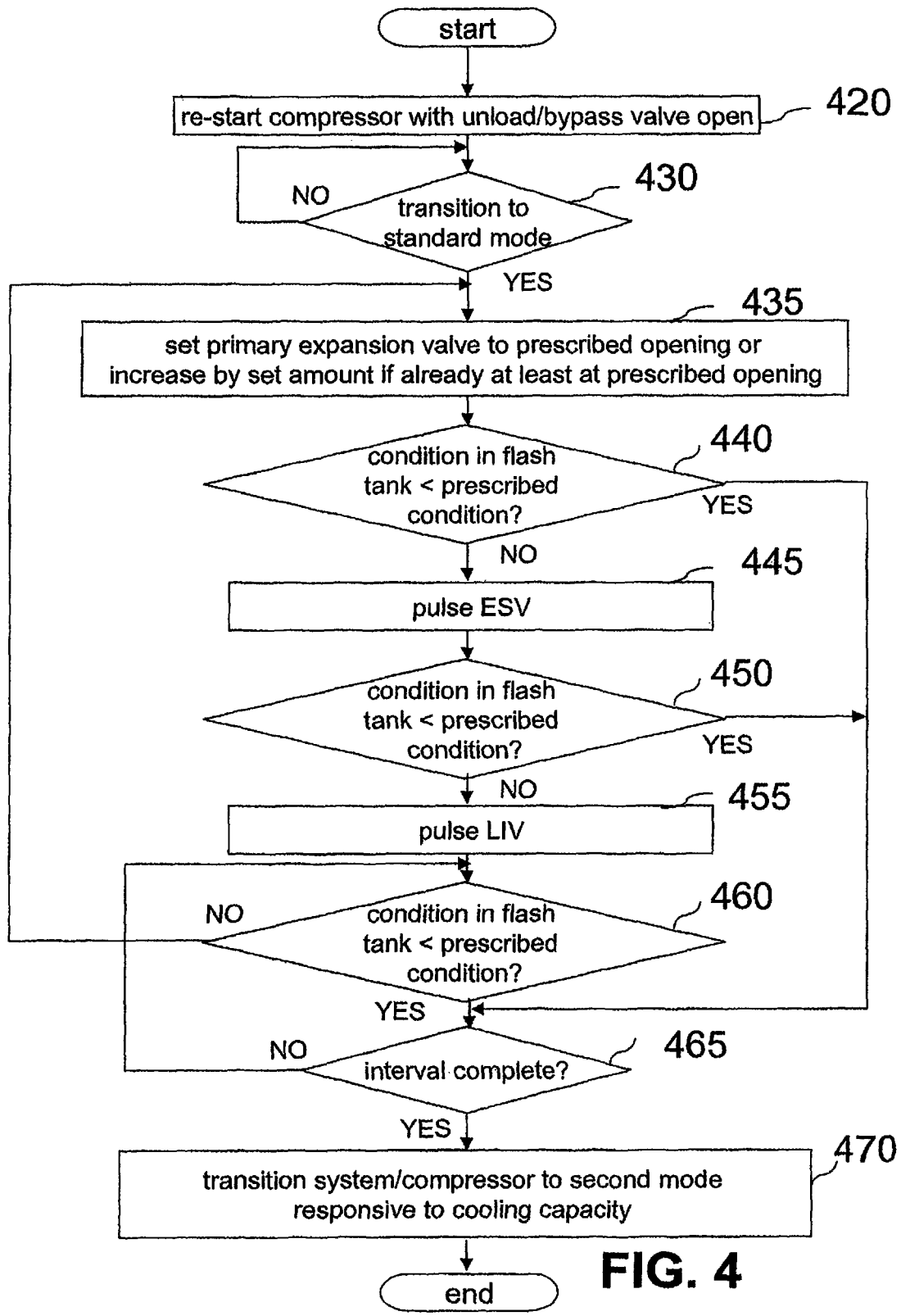
FIG. 4 is a flowchart that illustrates an embodiment of method of operating a transport refrigeration system according to the application.

Referring now to FIG. 4, upon restart, a compressor can operate with an unload valve 218 open and the flash tank can optionally be in refrigerant communication with a suction inlet of the compressor (operation block 420). Transition of the compressor to a first mode or standard mode can be determined (operation block 430). When the determination in operation block 430 is negative, control returns to operation block 430. When the determination in operation block 430 is affirmative because the compressor has staged to standard mode, the EVXV 252 can be set to a prescribed limit or if the EVXV 252 is equal to or greater than the prescribed limit, the setting of the EVXV 252 is increased by a prescribed increase amount. For example, the prescribed limit or opening of the EVXV valve could be 70% and if a current setting of the EVXV valve is not less than 70% open, the EVXV valve can be set by increasing its current opening by the prescribed increase amount such as 5% or 10% (operation block 435). Then, conditions in the flash tank receiver can be compared to a prescribed condition (operation block 440). The prescribed condition in operation block 440 can be a prescribed pressure such as a pressure threshold or refrigerant critical point.

When it is determined that the pressure in the flash tank receiver is greater than the pressure threshold (operation block 440, NO), the ESV (e.g., economizer solenoid valve) can be pulsed open in a controlled or modulated way (operations block 445). The pressure in the flash tank receiver can again be compared to the pressure threshold (e.g., prescribed limit) (operation block 450). When it is determined that the pressure in the flash tank receiver is above the prescribed limit (operation block 450, NO), the LIV can be pulsed opened or operated in a controlled or modulated way to allow refrigerant to migrate out of the flash tank receiver through the LIV (operation block 455). Then, the pressure in the flash tank receiver can be compared to the pressure threshold. When the pressure in the flash tank receiver is greater than the pressure threshold (operation block 460, NO), control returns to operation block 435. When the determination in operation blocks 440, 450, 460 is affirmative because the pressure in the flash tank receiver is less than the prescribed threshold, control continues to operation block 465. In operation block 465, it can be determined whether a predetermined time limit has passed. When the determination in operation block 465 is affirmative, the EVXV 252 can be set to control superheat (e.g., evaporator outlet) and the transport refrigeration unit 204 can transition to a second mode, which can be different from the first mode such as an economized mode (operation block 470). When it is determined in operation block 465 that the predetermined time interval has not passed (operations block 465, NO), control jumps to operation block 460. From operation block 470, the process can end.

An embodiment of a method of operating a transport refrigeration unit according to the application will now be described. The method embodiment shown in FIG. 5 can be implemented and it will be described using a refrigerant vapor compression system embodiment shown in FIG. 2; however, the method embodiment is not intended to be limited thereby.

Figure 5:
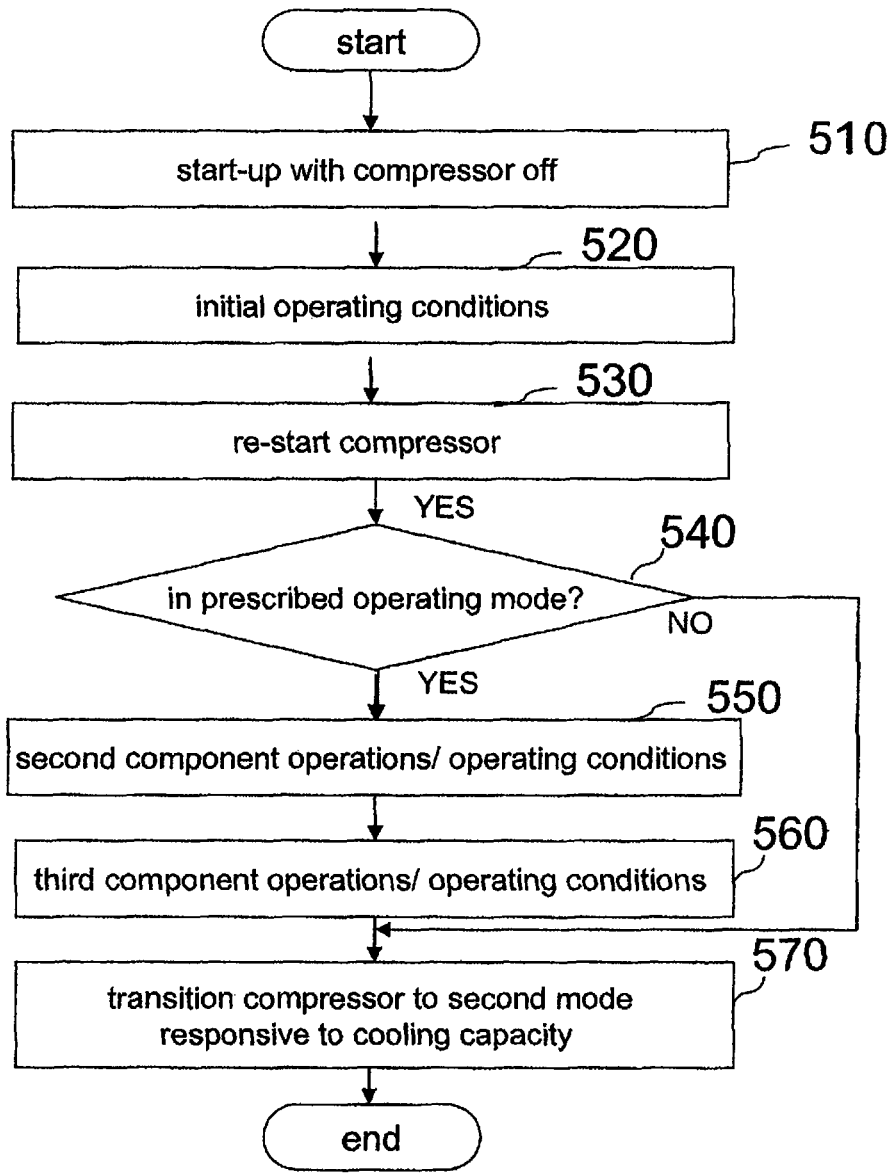
FIG. 5 is a flowchart that illustrates an embodiment of method of operating a transport refrigeration system according to the application.

Referring now to FIG. 5, upon restart of the transport refrigeration unit, selected components can be enabled. For example, heat exchanger fans (e.g., 226, 246) can be enabled (operation block 510). Then, first operating conditions for refrigerant distribution can be provided. For example, the primary and auxiliary expansion valves (e.g., 252, 236) can be opened to prescribed settings (e.g., fixed settings), respectively (operation block 520). In one embodiment, the primary expansion valve can be set between 45%-100% and the auxiliary expansion valve can be set between 25%-100%. The compressor 212 can be enabled with the unloader service valve 218 open and the economizer solenoid valve 264 open (operation block 530). Then, an operating mode of the transport refrigeration unit can be determined (operation block 540). For example, the operating mode can be a frozen operating mode or a perishable. When the determination in operation block 540 is the system is operating in a first prescribed operating mode, control continues to operation block 550. When the determination in operation block 540 is a second prescribed operating mode control can jump to operation block 570. In operation block 540, second operating conditions for refrigerant distribution can be set for the transport refrigeration unit. In one embodiment, the unloader service valve and the economizer solenoid valve are opened and the primary and auxiliary expansion valves (e.g., 252, 236) can be maintained or opened to second prescribed settings, respectively, in operation block 550. Operation block 550 can be maintained for a first prescribed interval. Then, third operating conditions for refrigerant distribution can be set for the transport refrigeration unit (operation block 560). In one embodiment, the unloader service valve and the economizer solenoid valve are closed, but the primary and auxiliary expansion valves (e.g., 252, 236) can be maintained at earlier settings or opened to third prescribed settings, respectively, in operation block 560. Operation block 560 can be maintained for a second prescribed interval. In operation block 570, the compressor can then transition to a cooling mode (e.g., standard, economized, etc.) responsive to the cooling capacity requirements upon completing operation block 560. After operation block 570, the primary expansion valve can be set to control heat absorption heat exchanger outlet superheat. From operation block 570, the process can end.

As shown in FIG. 5, operating conditions for refrigerant distribution move refrigerant from the flash tank to lower pressure areas of the transport refrigeration unit. In FIG. 5, no error conditions are monitored. Further in FIG. 5, third operating conditions for refrigerant distribution can be optional.

In one embodiment, operations blocks 510-570 can be completed in less than 5 minutes, less than 2 minutes, less than 1 minute or less than 10-20 seconds.

Various advantages that embodiments of apparatus, transport refrigeration units, and methods for operating the same can include controlling refrigerant distribution for a refrigerant vapor compression system. In more complex refrigeration vapor compression systems, such as those equipped with a multi-stage compression device and capacity modulation, it is customary to provide a number of refrigerant flow control devices to permit selective control of refrigerant flow through the various branches of the refrigerant circuit.

Exemplary system and method embodiments according to the application can be implemented using various configurations for a primary refrigerant loop or a plurality of coupled refrigerant loops, for example, in the transport refrigeration unit. In one embodiment, a bypass line and unloader service valve can be optional. In one embodiment, a liquid injection line and corresponding flow control device can be optional. In one embodiment, a vapor injection line and corresponding flow control device can be optional. In one embodiment, the economizer valve can be implemented using other flow control devices such as but not limited to an economizer expansion valve. In one embodiment, the vapor injection line can be configured to selectively input into the compressor mid stage and/or the compressor inlet port.

Refrigerant vapor compression systems are commonly used for conditioning air to be supplied to a climate controlled comfort zone within a residence, office building, hospital, school, restaurant or other facility. Refrigerant vapor compression system are also commonly used for refrigerating air supplied to display cases, merchandisers, freezer cabinets, cold rooms or other perishable/frozen product storage areas in commercial establishments. Refrigerant vapor compression systems are also commonly used in transport refrigeration systems for refrigerating air supplied to a temperature controlled cargo space of a truck, trailer, container, or the like for transporting perishable/frozen items by truck, rail, ship, or intermodal.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment. For example, aspects and/or features of embodiments variously described herein can be specifically interchanged or combined; for example, features in FIG. 3 or FIG. 5 can be combined with or replace features of FIG. 4 or FIG. 2.

We claim:

1. A method for distributing a refrigerant charge level in a refrigerant vapor compression system, the refrigerant vapor compression system having a refrigerant circuit including a refrigerant compression device, a refrigerant heat rejection heat exchanger downstream of said compression device, a refrigerant reservoir downstream of the heat rejection heat exchanger, a refrigerant heat absorption heat exchanger downstream of said refrigerant reservoir, and a primary expansion device disposed in the refrigerant circuit downstream of said refrigerant heat rejection heat exchanger and upstream of said refrigerant heat absorption heat exchanger, said method comprising:
   operating the refrigerant compression device at a speed;
   stopping the refrigerant compression device;
   after the refrigerant compression device has stopped, restarting the refrigerant compression device in a first mode;
   in the first mode, setting the primary expansion device to a prescribed degree of opening;
   in the first mode, comparing a condition at the refrigerant reservoir to a prescribed condition;
   in the first mode, in response to the condition being below the prescribed condition for a prescribed time interval transitioning the refrigerant vapor compression system to a second mode, the second mode comprising operating the primary expansion device to control the refrigerant heat absorption heat exchanger superheat;
   wherein the condition is a pressure condition and the prescribed condition is a prescribed pressure threshold;
   wherein the prescribed pressure threshold is a critical refrigerant pressure.

2. The method of claim 1, wherein, in the first mode, in response to the condition being above the prescribed condition:
   pulsing an economizer solenoid valve in a refrigerant vapor line coupling the refrigerant reservoir to an intermediate port of the refrigerant compression device.

3. The method of claim 1, wherein, in the first mode, in response to the condition being above the prescribed condition:
   pulsing a liquid injection valve in a liquid injection line between the refrigerant reservoir and an inlet port of the refrigerant compression device.

4. The method of claim 1, wherein the refrigerant vapor compression system is configured to use $CO_2$ refrigerant.

5. The method of claim 1, wherein setting the primary expansion device to a prescribed degree of opening includes increasing an opening of the primary expansion device by a set amount.

6. The method of claim 1, wherein the second mode is an economized mode.

7. A method for distributing a refrigerant charge level in a refrigerant vapor compression system, the refrigerant vapor compression system having a refrigerant circuit including a refrigerant compression device, a refrigerant heat rejection heat exchanger downstream of said compression device, a refrigerant reservoir downstream of the heat rejection heat exchanger, a refrigerant heat absorption heat exchanger downstream of said refrigerant reservoir, and a primary expansion device disposed in the refrigerant circuit downstream of said refrigerant heat rejection heat exchanger and upstream of said refrigerant heat absorption heat exchanger, said method comprising:
   operating the refrigerant compression device at a speed;
   stopping the refrigerant compression device;
   after the refrigerant compression device has stopped, restarting the refrigerant compression device in a first mode;
   in the first mode, setting the primary expansion device to a prescribed degree of opening;
   in the first mode, comparing a condition at the refrigerant reservoir to a prescribed condition;
   in the first mode, in response to the condition being below the prescribed condition for a prescribed time interval transitioning the refrigerant vapor compression system to a second mode, the second mode comprising operating the primary expansion device to control the refrigerant heat absorption heat exchanger superheat;
   further comprising sensing pressure at the refrigerant reservoir using a sensor, wherein the condition is a supercritical condition of the refrigerant in the refrigerant reservoir, wherein the refrigerant vapor compression system is configured to use $CO_2$ refrigerant.

8. The method of claim 7, wherein the second mode is an economized mode.

9. The method of claim 7, wherein prior to operating in the first mode, operating the refrigerant compression device with an unload service valve open; and draining refrigerant from the refrigerant reservoir using a downstream refrigerant flow control device.

10. The method of claim 7, wherein setting the primary expansion device to a prescribed degree of opening includes increasing an opening of the primary expansion device by a set amount.

* * * * *